United States Patent [19]
Cannon et al.

[11] Patent Number: 5,673,382
[45] Date of Patent: Sep. 30, 1997

[54] AUTOMATED MANAGEMENT OF OFF-SITE STORAGE VOLUMES FOR DISASTER RECOVERY

[75] Inventors: David Maxwell Cannon; Michael Allen Kaczmarski, both of Tucson, Ariz.

[73] Assignee: International Business Machines Corporation, Armonk, N.Y.

[21] Appl. No.: 655,791

[22] Filed: May 30, 1996

[51] Int. Cl.$^6$ ................................................. G06F 11/00
[52] U.S. Cl. ........................... 395/182.04; 395/182.13; 395/618; 395/620
[58] Field of Search ................. 395/182.04, 182.13, 395/182.17, 182.18, 618, 620, 622

[56] References Cited

U.S. PATENT DOCUMENTS

| | | | |
|---|---|---|---|
| 4,771,375 | 9/1988 | Beglin et al. | 364/200 |
| 5,274,804 | 12/1993 | Jackson et al. | 395/600 |
| 5,363,487 | 11/1994 | Willman et al. | 395/275 |
| 5,392,432 | 2/1995 | Engelstad et al. | 395/700 |
| 5,404,508 | 4/1995 | Konrad et al. | 395/182.04 |
| 5,412,801 | 5/1995 | De Remer et al. | 395/182.18 |
| 5,504,861 | 4/1996 | Corckett et al. | 395/182.11 |
| 5,555,371 | 9/1996 | Duyanovich et al. | 395/182.11 |
| 5,592,618 | 1/1997 | Micka et al. | 395/185.07 |
| 5,594,900 | 1/1997 | Cohn et al. | 395/600 |

FOREIGN PATENT DOCUMENTS

| | | | |
|---|---|---|---|
| 628906 | 12/1994 | European Pat. Off. | G06F 3/06 |

OTHER PUBLICATIONS

Mosse et al., "Analysis of a Fault Tolerant Multiprocessor Scheduling Algorithm", Fault tolernat Computing, Int'l Symposium, IEEE pp. 16–25 1994.

King et al., "Overview of Disaster Recovery for Tarnsaction Processing Systems", Distributed Computing Systems, int'l Conf. IEEE, pp. 286–293 1990.

*Primary Examiner*—Robert W. Beausoliel, Jr.
*Assistant Examiner*—Joseph E. Palys
*Attorney, Agent, or Firm*—Robert M. Sullivan

[57] ABSTRACT

A data processing system providing disaster recovery and using a client-server configuration provides a method and apparatus for reclaiming off-site storage volumes without requiring the volumes to be mounted or transported to the primary site. The system includes primary volumes and resident copy volumes at the primary site and off-site storage volumes for disaster recovery at the remote site. The system first determines which off-site storage volumes are eligible for reclamation. For each eligible off-site volume, the system locates, within the primary site, a primary copy of every file remaining on the off-site volume that is still required for disaster recovery. These primary copies are then copied to a resident recovery volume at the primary storage site. The eligible off-site volume is then marked empty, and the resident recovery volume is classified as an off-site volume. The resident recovery volume is then transported to the remote storage site and the empty off-site volume is returned to the primary storage site to be reused as a resident copy volume.

20 Claims, 5 Drawing Sheets

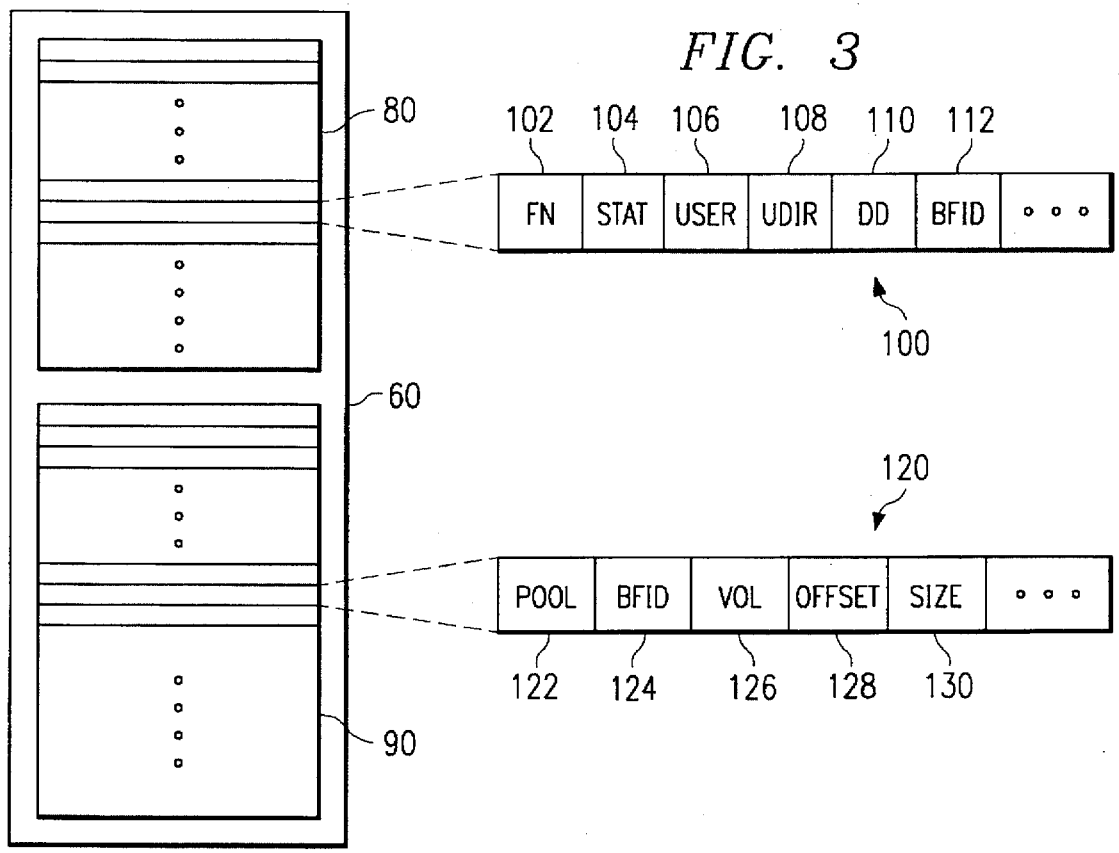
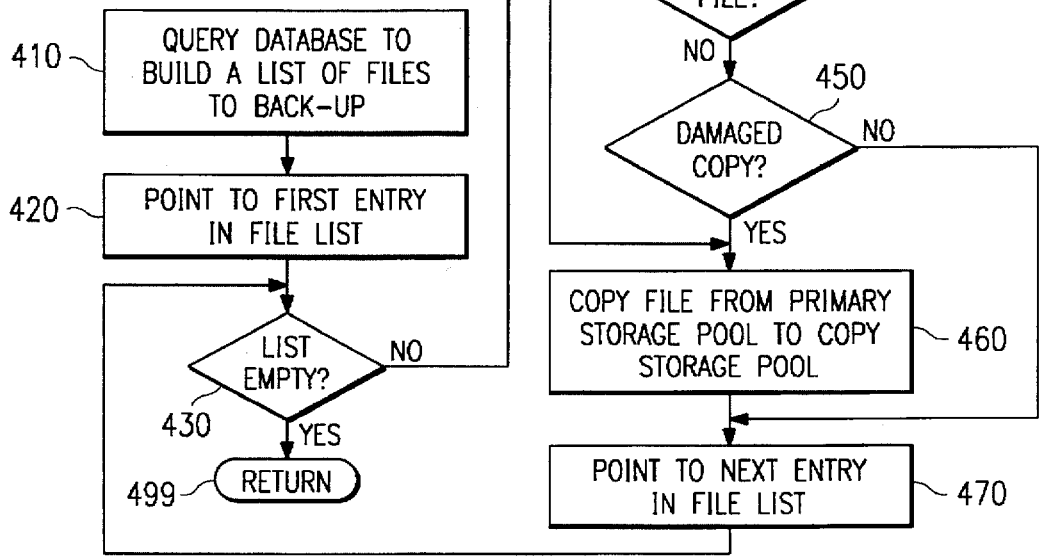

AUTOMATED MANAGEMENT OF OFF-SITE STORAGE VOLUMES FOR DISASTER RECOVERY

FIELD OF THE INVENTION

The present invention relates generally to disaster recovery in data processing systems using a storage management server system. More particularly, the present invention relates to a method and apparatus for automatically reclaiming off-site storage volumes by the storage management server. The storage management server stores primary copies and additional back-up copies of client data files on sets of storage volumes organized into storage pools. Some of the storage volumes are classified as off-site volumes by the storage management server and transported to a remote location for disaster recovery purposes.

BACKGROUND OF THE INVENTION

Data processing systems typically require a large amount of data storage. Customer data, or data generated by users within the data processing system, occupies a great portion of this data storage. Effective data processing systems also provide back-up copies of this user data to prevent a loss of such data. Many businesses view any loss of data in their data processing systems as catastrophic, severely impacting the success of the business. To further protect customer data, some data processing systems extend the practice of making back-up copies to provide disaster recovery. In disaster recovery systems, a back-up copy of the customer data is kept at a site remote from the primary storage location. If a disaster strikes the primary storage location, the customer data can be recovered from the back-up copies located at the remote site.

A known method of providing disaster protection is to mirror, or shadow, the primary storage data at a remote storage site. Remote dual copy, or remote data duplexing, is one form of this data mirroring solution. In remote dual copy, additional storage devices are provided in the data processing system such that an additional copy of the primary data is written to an additional storage device. Storage devices are coupled together to form duplex pairs, each duplex pair consisting of a primary and secondary storage device. The primary storage device is located at the primary storage location, while the secondary storage device is located at the remote site. When data is written to the primary storage device, the data processing system automatically copies the data to the secondary storage device. The secondary storage device forms an exact physical image, or mirror, of the primary storage device. Thus, the primary and secondary storage devices must be the same physical geometry, with the secondary storage device configured and formatted exactly as the primary storage device.

Remote dual copy falls into two general categories, synchronous and asynchronous. Synchronous remote dual copy involves sending primary data to the secondary location and confirming the reception of such data before completing the current input/output (I/O) operation. That is, a subsequent I/O operation at the primary site cannot start until the primary data has been successfully copied to the secondary storage device. On the other hand, asynchronous remote dual copy completes the I/O operation to the primary storage device before the data is copied to the secondary storage device. That is, a subsequent I/O operation at the primary site can begin before the primary data from the previous I/O operation has been copied to the secondary site.

Remote dual copy is an expensive form of disaster recovery in that the secondary storage devices must be the same device geometry as the primary storage devices. Data processing systems commonly use direct access storage devices, or DASDs, as a substantial portion of the primary data storage. With remote dual copy, secondary data storage at the remote site must also use DASDs to mirror the primary data storage. Using DASDs as back-up storage is an inefficient use of this storage medium. A more desirable solution is to use a less expensive media for remote storage. In addition, remote dual copy is also expensive in that it requires a large system overhead to transfer a copy of the user file from the primary storage location to the secondary, or remote, storage location. A host processor and storage controller in both the primary and secondary storage subsystems cooperatively manage the data storage within the duplex pairs, insuring that the primary and secondary storage devices are exact replicas.

Full volume copying is an alternate means for providing disaster recovery. In this configuration, customer data on primary storage volumes at the primary storage location is periodically copied to copy storage volumes having a removable media, such as magnetic tape. The copy storage volumes are then transported to a remote storage area located a sufficient distance from the primary storage location. As its name implies, full volume copying provides back-up copies of files on a volume boundary. That is, the entire contents of a primary storage volume are copied to a copy storage volume. Thus, the copy storage volume mirrors the primary storage volume.

A simple implementation of full volume copying periodically copies customer data stored on primary storage volumes to a copy storage volume. The primary storage volumes are typically direct access storage devices (DASDs), magnetic tape cartridges, or optical disks. The copy storage volumes must consist of a removable storage media, and are typically magnetic tape. The copy storage volumes are then transported to a remote site and typically placed in a secure chamber. A storage administrator determines which user files need to be copied to the copy storage volumes, how often the back-up copies should be made, and which set of copy storage volumes should be transported to the remote site. The storage administrator also manages the off-site storage volumes, determining which volumes are needed for disaster recovery. Off-site storage volumes no longer needed for disaster recovery can be reclaimed and reused. The storage administrator typically coordinates the reclamation and reuse of the off-site storage volumes.

A more automated implementation of full volume copying uses a storage management server to generate copy storage volumes from the primary storage volumes. Generally, a client-server configuration includes several clients connected to a single server. The clients create client files and transfer these files to the server. The server receives the client files and stores them on several attached storage devices. When used as a storage management system, the server manages the back-up, archival, and migration of these client files. By storing the client file on an attached storage device, the server creates a first back-up, or primary, copy of the client file. The server may, in turn, create additional back-up copies of the client file to improve the data availability and data recovery functions of the storage management system. Clients may vary from small personal computer systems to large data processing systems having a host processor connected to several data storage devices. The server can also range from a small personal computer to a large host processor.

To provide disaster recovery, the storage management server must generate an additional back-up copy of the client file and oversee the transport of this back-up copy to a remote site. Typically, the server is connected to storage subsystem consisting of random access storage, such as DASDs, and sequential storage, such as magnetic tapes. As a disaster recovery system, the server partitions the storage subsystem into a set of primary storage volumes and a set of remote, or off-site, storage volumes. The off-site storage volumes must contain removable media, so that they can be transported to the remote site.

As stated earlier, the storage manager server uses full volume copying to create an additional back-up copies of client files. That is, the server creates an additional back-up by replicating the contents of a first storage volume to a second storage volume. The first storage volume is located in the primary storage of the server and contains the primary copy of the client files transferred to the server system from the client systems. To provide disaster recovery, the server marks the second storage volume as an off-site volume, to be delivered to the remote site. When marked as an off-site volume, the second storage volume can no longer receive subsequent back-up copies of client files from the server until the volume is reclaimed.

The server also determines which client files need to be backed-up within the storage subsystem, how frequent these back-up copies should be made, and which set of storage volumes should be marked as off-site volumes and transported to the remote site. The server, in turn, manages the off-site storage volumes, determining which volumes are needed for disaster recovery. Off-site storage volumes no longer needed for disaster recovery can be reclaimed and reused. The server typically coordinates the reclamation and reuse of the off-site storage volumes. Successful reclamation and reuse of off-site volumes no longer needed for disaster recovery substantially improves the efficiency and performance of a disaster recovery system.

Full volume copying has several disadvantages when used as a disaster recovery solution. Since full volume copying requires the off-site, or back-up, storage volume to mirror the primary storage volume, the off-site volume can quickly become outdated when the contents of the primary volume are updated. This increases the frequency in which the full volume copies need to be generated. Moreover, making more frequent full volume copies of primary storage volumes increases the number of files within the volumes that likely remain unchanged since the previous volume copy was completed. Copying unchanged files results in additional data being unnecessarily copied to the off-site volume. In turn, this unnecessary copying of additional data increases the amount of storage media and time required to generate the back-up storage volumes for disaster recovery.

Full volume copying also can propagate inefficient use of storage volumes. That is, a partially full primary storage volume will be duplicated to the off-site storage volume. This doubles the amount of unused, and unavailable, space within the server system. In addition, files are sometimes moved from one storage volume to another within the primary storage. For instance, files may be migrated within a storage hierarchy in the primary storage, or files may be compressed onto a primary storage volume from other volumes. In these instances, full volume copying requires that the both the source and destination primary volumes be replicated onto new off-site volumes and delivered to the remote site.

Furthermore, full volume copying complicates the management of the off-site volumes. As previously described, full volume copying can propagate partially filled storage volumes to the remote storage site and unnecessarily duplicate unchanged files among multiple off-site volumes. These disadvantages increase the amount of storage and time required to maintain disaster recovery protection within the data processing system. Moreover, the storage administrator manages the off-site volumes. Additional storage volumes at the remote site increases the difficulty in determining which off-site volumes are no longer needed for disaster recovery.

An essential part of effective disaster recovery is to reclaim and reuse off-site volumes that no longer contain a minimum number of files needed for disaster recovery. The storage administrator monitors the number of files stored within each off-site volume that are still required for disaster recovery purposes. When the amount of unused space on an off-site volume exceeds a certain threshold, the remaining files can be moved to another off-site volume and the current off-site volume can be reclaimed. Once reclaimed, the off-site volume can be returned to the primary storage site and reused. Full volume copying hampers the ability of the storage administrator, or storage manager, to effectively reclaim and reuse off-site storage volumes.

Incremental back-up techniques improve the efficiency of a disaster recovery system. Incremental back-up copies to a copy storage volume only the user files new to the primary storage volume since the last periodic back-up operation was completed. Thus, incremental back-up eliminates the unnecessary copying of files that remain unchanged since the previous back-up operation. As compared to full volume copying, incremental back-up reduces the number of partially filled storage volumes at the remote site. It also reduces the amount of duplicate files and duplicate volumes stored at the remote site, thereby simplifying the management of off-site storage volumes.

A storage management server currently provides incremental back-up. The server includes a set of primary storage volumes and a set of copy storage volumes. The server stores primary copies of client files on the primary storage volumes. The server periodically generates back-up copies of client files from the primary storage volumes to the copy storage volumes. The server makes back-up copies of only those primary copies new to the primary storage volumes since the previous back-up operation. To provide disaster recovery protection, the server classifies some of the copy storage volumes as off-site volumes. The off-site volumes are subsequently transported to a remote storage site. The server manages the off-site storage volumes, determining which volumes are needed for disaster recovery and which volumes may be reclaimed.

However, problems still exist in the management of the off-site storage volumes even when incremental back-up techniques are used. As outdated primary copies of client files are expired from the server, the corresponding back-up copies are no longer needed in the remote storage site. In turn, the amount of relevant space, space occupied by back-up copies needed for disaster recovery, decreases on the off-site storage volumes. When the reclamation threshold is reached on a particular off-site storage volume, the server reclaims the volume by copying the remaining files to an alternate storage volume. However, the server cannot mount the volume to be reclaimed since it is located off-site. Moreover, the server cannot return the file to the primary storage site for mounting since a disaster occurring at the primary site would destroy the off-site data. Thus, disaster protection is lost when the off-site volume is moved to the primary storage site before the volume has been reclaimed.

Accordingly, an improved method in a disaster recovery system is needed to reclaim off-site storage volumes without requiring that the off-site volumes be transported and mounted in the primary storage location. In addition, a method is needed in a storage management server providing disaster recovery to reclaim off-site storage volumes before transporting the volumes to the primary storage site for reuse within the server.

SUMMARY OF THE INVENTION

An object of the present invention is to provide an improved method at a primary storage site for reclaiming storage volumes located at a remote site within a disaster recovery system when such storage volumes are no longer needed for disaster recovery. Such method reclaims the off-site storage volume without mounting the volume at the primary storage site.

Another object of the present invention is to provide a storage management server at a primary storage site for reclaiming storage volumes located at a remote site within a disaster recovery system when such storage volumes are no longer needed for disaster recovery. The storage management server reclaims the off-site storage volume without mounting the volume at the primary storage site.

A first embodiment of the present invention includes a method within a data processing system providing disaster recovery for reclaiming an off-site storage volume without mounting the volume at a primary storage site. The method first determines which off-site storage volumes are eligible for reclamation. For each eligible off-site volume, the method locates, within the primary storage site, a copy of the files remaining on the off-site volume that are still required for disaster recovery. These primary copies are then copied to a copy storage volume at the primary storage site. The eligible off-site volume is then marked empty, and the copy storage volume is classified as an off-site volume. The copy storage volume is then transported to the remote storage site and the empty off-site volume is returned to the primary storage site.

Another embodiment of the present invention includes a data processing system for disaster recovery. The disaster recovery system contains a storage management server coupled to plurality of client systems. The server includes a storage manager, a database, and a plurality of storage pools. The storage manager is coupled to the database and the storage pools. A first storage pool, a primary storage pool, contains a set of primary storage volumes for storing a primary copy of client files. The primary storage volumes are located at a primary storage site. A second storage pool, a copy storage pool, contains a set of copy storage volumes for storing a back-up copy of client files. The copy storage volumes consist of resident volumes located at the primary storage site and off-site volumes transported from to a remote storage site.

The storage manager receives client files from the client system and stores a primary copy of the client files in the primary storage pool. The storage manager also performs an incremental back-up operation by copying the newly created, or newly updated, client files in the primary storage pool to the copy storage pool. The storage manager determines which copy storage volumes are marked as off-site volumes and transported to the remote storage site. The storage manager also maintains a reference list, or index, within the database linking the primary copy of a client file to the back-up copy of the file within the copy storage pool. Finally, the storage manager automatically reclaims off-site storage volumes no longer needed for disaster recovery before transporting the off-site volumes to the primary storage site.

The foregoing and other objects, features, and advantages of the invention will be apparent from the following more particular description of a preferred embodiment of the invention, as illustrated in the accompanying drawings.

DESCRIPTION OF THE FIGURES

FIG. 3 is a block diagram of the database included in FIG. 1 showing the reference list, or index, which links the primary copy of the client files with their back-up copies.

FIG. 4 contains a flow diagram of a method for the server in FIGS. 1 and 2 providing incremental back-up of a first storage volume within a primary storage pool to a second storage volume within the copy storage pool.

DETAILED DESCRIPTION OF THE INVENTION

Figure 1:
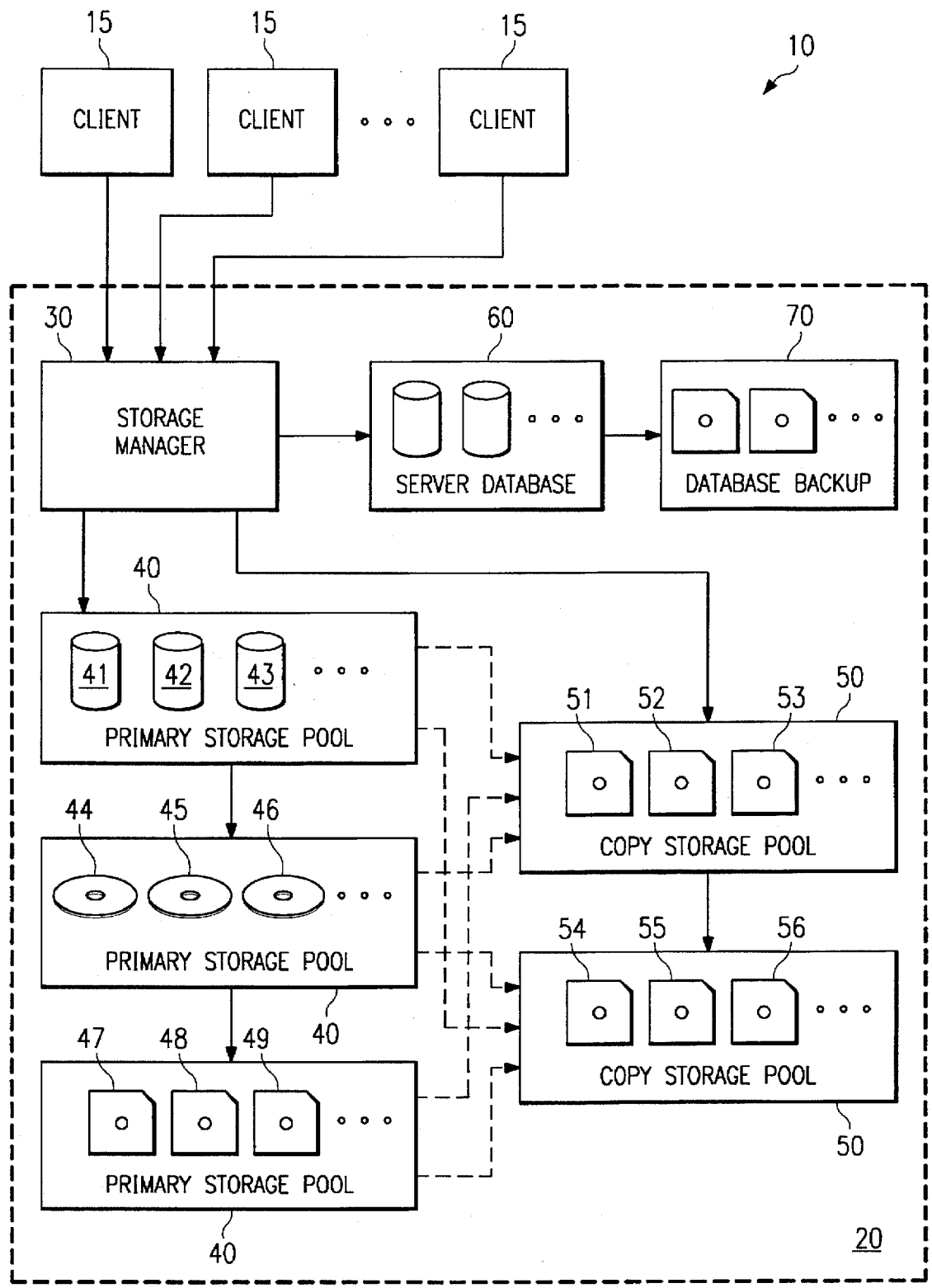
FIG. 1 is a block diagram of a data processing system showing a plurality of client systems coupled to a storage management server.

Referring more particularly to the drawing, like numerals denote like features and structural elements in the various figures. The invention will be described as embodied in a data processing system incorporating remote data duplexing for disaster recovery. Turning now to FIG. 1, a data processing system 10 is shown having multiple client systems 15 coupled to a server system 20. The server system 20 includes a storage manager 30 coupled to a server database 60. The storage manager 30 is further coupled to a plurality of primary storage pools 40 and a plurality of copy storage pools 50. A storage pool 40, 50 consists of a plurality of storage devices, either DASD, optical disk, or magnetic tape devices. All storage devices within a single storage pool 40, 50 are identical in type and format. The server database is further coupled to a set of storage volumes 70 providing a back-up for the server database 60.

Each client system 15 creates original user data files, or client files, which are stored within the corresponding client system 15. The client systems 15 transfer client files to the server system 20. Transferring client files to the server 20 inherently provides a back-up mechanism within the server 20 for these original client files. The storage manager 30 directs the client file to a storage device, or storage volume, within a primary storage pool 40. The primary storage pool 40 stores a primary copy of the client files. The storage manager 30 maintains a catalog within the server database 60 listing the files stored within the storage pools 40, 50 of the server system 20. Once the client file is stored within a primary storage pool 40, the storage manager 30 updates the server database 60 to catalog this file within the server system 20.

The server system 20 also generates an additional back-up copy of the client file and stores this back-up copy on a storage device, or storage volume, within a copy storage pool 50. The storage manager 30 coordinates this operation. Once the additional back-up copy is created within the copy storage pool 50, the storage manager 30 updates the server database 60 to catalog the additional back-up copy of the client file. In addition, the catalog entry within the server database corresponding to the additional back-up copy includes a cross-reference to the primary copy of the client file. Thus, the primary copy in the primary storage pool 40 is linked to the additional back-up copy within the copy storage pool 50. Finally, the server database 60 is backed-up to a set of storage volumes 70.

Figure 2:
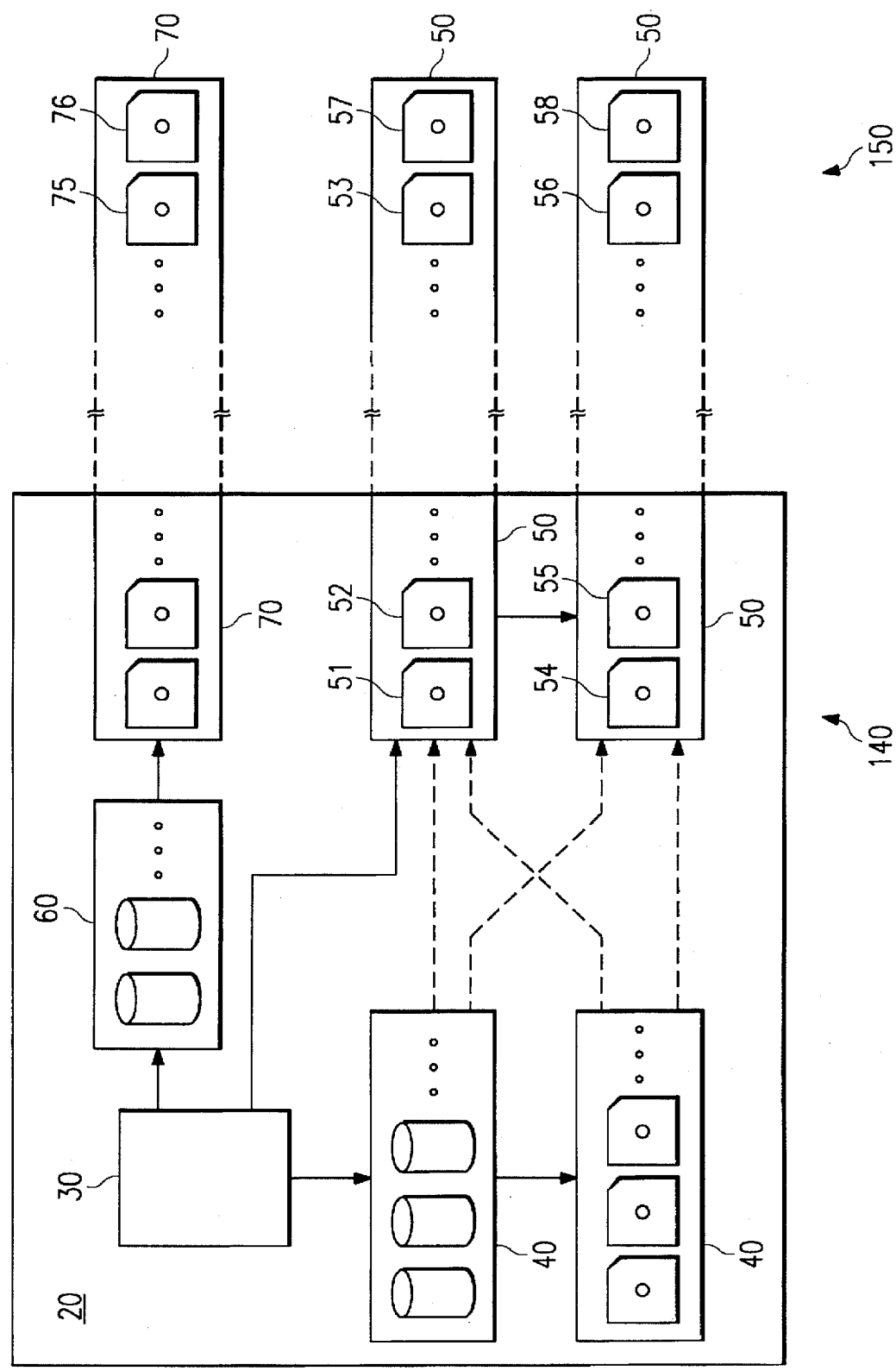
FIG. 2 is a block diagram of the storage management server in FIG. 1 providing off-site storage volumes for disaster recovery.

FIG. 2 shows the storage management server of FIG. 1 configured as a disaster recovery system. The disaster recovery system includes a primary storage site 140 and a remote storage site 150. The primary storage site 140 includes the storage manager 30, the server database 60, and the database back-up 70. In addition, the primary storage site 140 contains the primary storage volumes within the primary storage pools 40 and the resident copy storage volumes 51-52, 54-55 within the copy storage pools 50. The remote storage site 150 contains off-site storage volumes 53, 57, 56, 58, which are copy storage volumes that have been transported from the primary storage site 140 at the direction of the storage manager 30. The off-site storage volumes 53, 56, 57, 58 maintain their affiliation with the copy storage pools 50 at the primary storage site 140 after the volumes have been delivered to remote site 150. In addition, the database back-up 70 for the server database 60 contains storage volumes 75, 76 at the remote site.

The storage manager 30 manages the disaster recovery system by copying the primary copies of client files to a copy storage volume 56. The storage manager 30 then determines which copy storage volumes 51-58 should be used for disaster recovery and marks the volume 56 in the server database 60 as off-site storage volume 56. Copy storage volumes 51-58 marked as off-site volumes 56 are then transported to the remote site. The storage manager 30 uses the server database 60 to monitor the back-up copies of the client files stored on the off-site storage volumes 53, 56-58. The storage manager 30 can then determine when an off-site storage volume 58 is no longer needed for disaster recovery and mark this volume 58 for transport back to the primary storage site 140 to be reused as a resident storage volume 51-52, 54-55 in the copy storage pool 50.

Referring to FIG. 3, this block diagram shows two portions of the server database 60, a server storage inventory 80 and a server storage reference list 90. The inventory 80 and reference list 90 are used to catalog files stored within the storage pools 40, 50 of the server 20. An entry 100 is expanded to show some of the information contained within the server inventory 80. Likewise, one entry 120 within the reference list 90 is expanded to show some of the information kept within this portion of the server database 60. Each entry 100 within the inventory 80 corresponds to a primary copy of a client file stored within the server 20. Whereas, each entry 120 within the reference list 90 corresponds to any copy of a client file contained within the server 20, either a primary copy in the primary storage pool 40 or an additional back-up copy within the copy storage pool 50. That is, a client file copied multiple times within the server 20 will have a single entry 100 in the server inventory 80, but multiple entries 120 within the reference list 90.

The server inventory entry 100 provides a first field 102 for storing the file name 102 of the client file. A second field 104 is provided to maintain a status indicator 104 for the client file. This status flag 104 indicates whether the file is active or inactive. The storage manager 30 within the server 20 periodically determines, and adjusts, the status 104 of each client file within the server inventory 80. A third field 106 within each server inventory entry 80 lists the user name 106. The user name 106 identifies which client system 15 owns the specified client file. A fourth field 108 provides the directory name 108 within the client system 15 where the corresponding client file originated. A fifth field 110 records the date and time 110 when the primary copy of client file was stored within the server 20.

Finally, a sixth field 112 contains an unique identifier for the primary copy of the client file, denoted the bit-file identifier (bfid) 112. As stated previously, each primary copy of a client file stored within the server system 20 is logged as a separate entry 100 into the server inventory 80. Each entry 100 within the inventory 80 receives a separate, unique bfid 112. Thus, a client system may transfer to the server 20 multiple versions of the same client file at different times. Multiple entries 100 would be kept within the server inventory 80 and each entry would receive a unique bfid 112 corresponding to the distinct time in which the client system 15 transferred the file to the server 20. In addition, an additional back-up copy of the client file may be created and stored in a storage volume within a copy storage pool 50. This back-up copy receives the same bfid 112 as the corresponding primary copy of the client file and is not separately logged into the server inventory 80.

The reference list 90 contains an array of entries 120, one entry 120 for either an initial or additional back-up copy of a client file. Each entry 120 within the reference list 90 specifies where the associated copy of the client file, either a primary copy or an additional back-up copy, is located within the server 20. Each client file copied and stored within the server 20 is identified by a unique bfid 112. The bfid 112 is recorded in a second field 124 within the reference list entry 120. The server 20 storage is organized into storage pools 40, 50, which are simply sets of storage volumes. A file may be located within the server 20 storage by specifying the storage pool, the storage volume within the storage pool, and the offset within the storage volume. Accordingly, a field is provided within the reference list entry for each of these parameters: a storage pool identifier 122, a storage volume identifier 126, and an offset 128 within the storage volume. In addition, a fifth field 130 is provided within the reference list entry 120 to store the size 130 of the file.

The bfid 112 links the reference list 90 with the inventory 80. The inventory 80 contains information about the original client file: the filename 102, the client system name 106, and the directory name 108 within the client system 15 where the original file resides. The reference list 90 contains the location of copies of the client file, initial and back-up, within the server 20 storage: the storage pool 122, the storage volume 126 within the storage pool, and the offset 128 on the storage volume. Each inventory entry 100 and reference list entry 120 contains the bfid 112, 124 for the file copy. Besides providing each primary copy of a client file with a unique identifier, the bfid 112 also maps the information within the inventory 80 to the reference list 90.

As stated earlier, incremental back-up techniques improve the efficiency and performance of a disaster recovery system. Incremental back-up makes copies on a copy storage volume of only the user files that are new to the primary storage volume since the last periodic back-up operation was completed. As compared to full volume copying, incremental back-up reduces the number of partially filled storage volumes at the remote site. It also reduces the amount of duplicate files and duplicate volumes stored at the remote site. The storage management server 20 described in FIGS. 1 and 2 performs incremental back-up operations to generate back-up copies of the client files in the copy storage pools. Thus, copy storage volumes 51–52, 54–55 and off-site storage volumes 53, 56–58 contain back-up copies of only the client files that are new or updated within the server 20.

Accordingly, FIG. 4 shows a flow diagram describing a method 400 within the server 20 for providing an incremental back-up operation from a primary storage pool 40 to a copy storage pool 50. An incremental back-up operation within the server 20 generates an additional back-up copy of only those files within a storage volume 41–43 of a primary storage pool 40 that have changed or been added since a previous periodic back-up of the storage volume 41–43. The storage manager 30 determines when an incremental back-up operation occurs within the server 20, and typically contains a control program to execute the incremental back-up operation.

A step 410 is provided to query the server database 60 to build a list of files to be copied from a primary storage pool 40 to a copy storage pool 50. As stated previously, the server database 60 maintains a bfid 112 for each client file, a storage volume identifier for each storage volume, and a storage pool identifier 122 for each primary 40 or copy 50 storage pool. Step 410 first searches the database 60 for all client files residing on the primary storage volumes 41–43 within the primary storage pool 40. The bfids 112 of these client files are then combined with the storage pool identifier 122 of the copy storage pool 50 to find matched entries within the database 60. The client files that are not located within the copy storage pool 50, where no matched entry is found in the database 60, are added to the list.

A step 420 is provided to point to the first entry within the newly built file list. At step 430, the file list is checked to determine if the current entry indicates that the end of the list has been reached. If so, step 499 indicates the completion of the incremental back-up operation. Otherwise, a step 440 checks the current entry in the file list to determine if it corresponds to a new file in the primary storage pool 40. That is, a primary copy of the client file was created on a primary storage volume 41–43 that has not been backed-up to the copy storage pool 50.

If the current entry does not represent a new file, a step 450 checks to see if the current entry represents a file on a primary storage volume 41–43 with a corresponding damaged copy on a copy storage volume 51–53 within a copy storage pool 50. If either test in steps 440 or 450 is met, the primary copy of the client file is copied from its primary storage volume 41–43 to a copy storage volume 51–53 at step 460. Otherwise, a step 470 selects the next entry within the file list and then returns to step 430 to check if the end of the file list has been reached.

As stated earlier, reaching the end of the file list signals that the incremental back-up operation 400 is complete. Back-up copies have been made from the primary copies of new or updated client files. These back-up copies reside on a copy storage volume 51–52, 54–55 at the primary storage site 140. The storage manager 30 may then classify a copy storage volume 51–52, 54–55 as an off-site storage volume as a result of the just completed incremental back-up operation 400. If so, the storage manager 30 updates the server database 60 to indicate the changed status of the copy storage volume. Subsequently, the copy storage volume is transported to the remote site 150. The server database 60 still monitors the back-up copies contained on each off-site storage volume 53, 56–58 by the bfids 112 of the client files. The storage manager 30 uses this reference location information to manage the off-site storage volumes 53, 56–58 and determine which volumes contain back-up copies still needed for disaster recovery.

Figure 5:
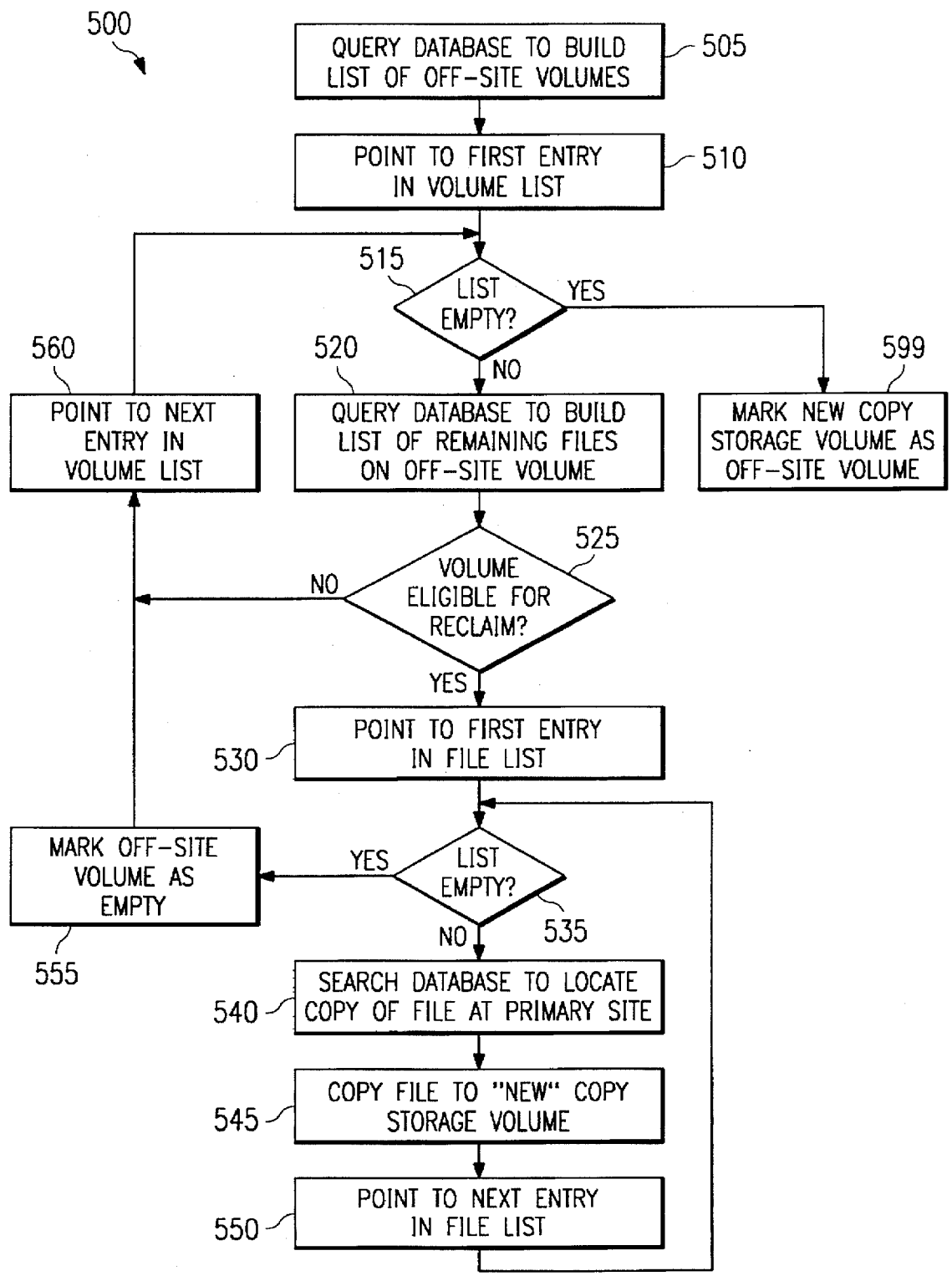
FIG. 5 contains a flow diagram of a method for the server in FIGS. 1 and 2 reclaiming an off-site storage volume without requiring the off-site volume to be first transported to the primary storage site.

Referring now to FIG. 5, a flow diagram describes a method 500 in the storage management server of FIGS. 1 and 2 for reclaiming an off-site storage volume 53 without transporting the off-site volumes 53 to the primary storage site 140. A step 505 queries the server database 60 to build a list of off-site storage volumes. Each entry in the list identifies a copy storage volume 51–58 located at a remote storage site 150. As described previously, the server database 60 contains storage volume identifiers 126 and storage pool identifiers 122 for each of the copy storage volumes 51–58 within the copy storage pools 50. A step 510 points to the first entry within the newly built volume list. At step 515, the volume list is checked to determine if the current entry indicates that the end of the list has been reached. If so, step 599 indicates the completion of the off-site volume reclamation 500. Otherwise, step 520 queries the server database 60 to build a list of files remaining on the selected off-site storage volume. Each entry in the list identifies a back-up copy of an unexpired client file within the primary storage location 140 which must be kept at the remote storage site 150 for disaster recovery. As described previously, the server database 60 contains bfids 112 uniquely identifying each primary copy of a client file.

A step 525 checks whether the selected off-site storage volume is eligible for reclamation. Typically, the amount of space occupied by the number of remaining files on the off-site volume is compared to a minimum threshold. If the amount of space is less than the threshold, the off-site volume can be reclaimed. If the off-site volume is not eligible for reclamation, step 560 points to the next entry in the off-site volume list. Otherwise, step 530 points to the first entry in the file list of the selected off-site volume. A step 535 determines whether the end of the file list has been reached. If not, step 540 searches the server database 60 to locate a copy of the selected file at the primary storage site 140. The bfid 112 of the selected file is used to search the reference location information 90 within the server database 60 to find a primary copy of the selected file. Once located, step 545 copies the primary copy from a primary storage volume to a resident copy storage volume within the copy storage pool 50 containing the selected off-site volume.

A step 550 points to the next entry within the file list and returns to step 535 to check whether the end of the file list has been reached. If not, steps 540 and 545 are repeated for the next remaining file on the selected off-site storage volume. Otherwise if the end of the file list has been reached, step 555 marks the off-site volume empty. That is, new back-up copies of the files required for disaster recovery have been generated on a resident copy storage volume within the same copy storage pool 50 as the off-site storage volume. A step 560 then points to the next entry in the off-site volume list and returns to step 515 to check whether the end of the volume list has been reached. When the end of the volume list is reached, step 599 classifies the newly updated, resident copy storage volumes as off-site volumes, to be delivered to the remote storage site 150. In turn, the reclaimed off-site storage volumes are then returned to the primary storage site 140 and reclassified as resident copy storage volumes.

Figure 6:
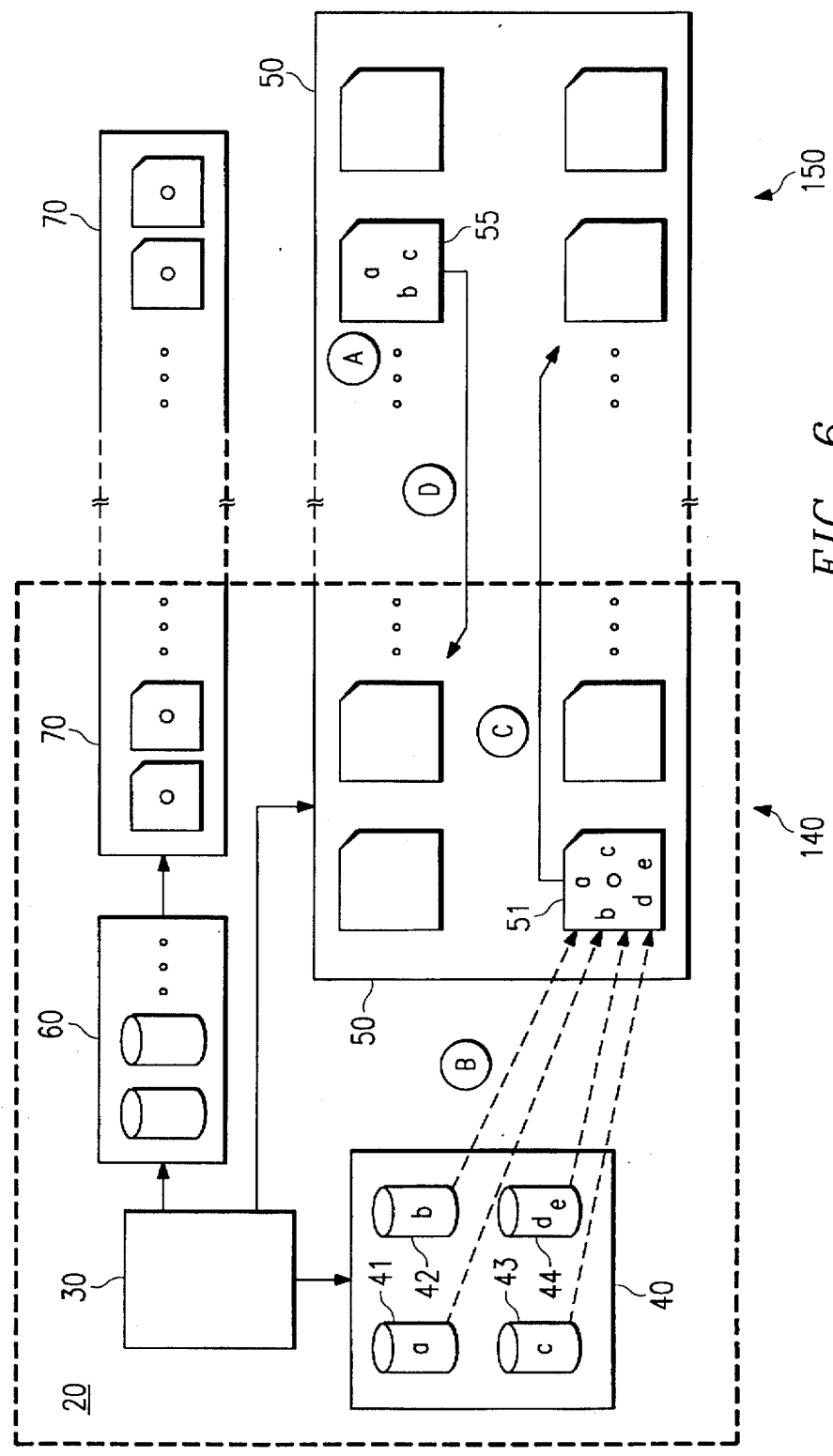
FIG. 6 is a block diagram showing the storage management server in FIG. 2 reclaiming an off-site storage volume and subsequently returning the off-site volume to a primary storage site for reuse.

FIG. 6 illustrates a storage management server 20 within a disaster recovery system reclaiming an off-site storage volume and returning the off-site volumes to the primary storage site 140. The server 20 includes a storage manager 30, a database 60, a database back-up 70, a primary storage site 140, and a remote storage site 150. The primary storage site 140 includes a primary storage pool 40 having primary storage volumes 41–44 and a copy storage pool 50 having resident copy storage volumes 51–54. Likewise, the remote storage site 150 includes off-site storage volumes 55–58 belonging to the same copy storage pool 50. Four transactions labelled A, B, C, D are shown in the figure. In transaction A, an off-site storage volume 55 is checked to determine if it can be reclaimed. As described in FIG. 5, an off-site volume can be reclaimed if it contains less than a minimum threshold of remaining files required for disaster recovery protection. In this example, the off-site storage volume 55 is eligible for reclamation since it contains less than the threshold number of remaining files a, b, c.

In transaction B, the storage manager 30 directs an incremental back-up operation 400 from the primary copy storage pool 40 to the copy storage pool 50. New client files d, e are copied from a primary storage volume 44 to a resident copy storage volume 51. In addition, the storage manager 30 copies the primary copies corresponding to the remaining files a, b, c on the off-site storage volume 55 from the primary storage volumes 41–43 to a resident copy storage volume 51. Once files a, b, c are copied to the resident copy storage volume 51, the reclamation of the off-site storage volume 55 is complete. The storage manager 30 then updates the server database 60 to indicate that the off-site volume 55 is empty and the resident copy storage volume 51 is classified as off-site. Transaction C then transports the resident copy storage volume 51 to the remote storage site 150 as an off-site storage volume. In turn, transaction D returns the off-site storage volume 55 to the primary storage site 140 as a resident copy storage volume. The new resident copy storage volume 55 can now be reused by the server 20 at the primary storage site 140.

Figure 7:
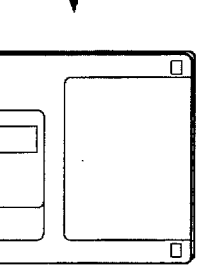
FIG. 7 is a block diagram representing a storage medium or memory for storing computer executable instructions.

FIG. 7 depicts a storage medium 700 for storing executable computer instructions, such as a magnetic diskette, an optical disk cartridge, or a magnetic tape cartridge. This figure also represents memories used to store executable computer instructions, such as read-only memory (ROM) or programmable memory (PROM). The requirement for these storage mediums or memories is that they store digital representations of computer executable instructions.

While the invention has been particularly shown and described with reference to preferred embodiments thereof, it will be understood by those skilled in the art that various changes in form and details may be made therein without departing from the spirit and scope of the invention. For example, the client systems and the server system have been shown in the figures as separate hardware systems. However, within the scope of the present invention, the client systems and the server system could be separate software applications running under the same data processing system. A primary copy of a client data file may have a back-up copy on a resident copy storage volume in one copy storage pool, but may also have an additional back-up copy on an off-site storage volume in a different copy storage pool. Further, copy storage volumes are not meant to be limited to magnetic tape, but may comprise other storage media, such as DASD or optical disk. Likewise, primary storage volumes may also comprise any storage media, and are not limited to the types of media represented in the figures.

What is claimed is:

1. In a disaster recovery system having a primary storage site and a remote storage site, said remote storage site having a plurality of off-site storage volumes for storing a disaster recovery copy of client data files, said primary storage site having a plurality of client systems generating said client data files, and a server coupled to said plurality of client systems for managing copies of said client data files at said primary storage site and said remote storage site, said server comprising:

a plurality of primary storage volumes for storing a primary copy of said client data files;

a plurality of resident copy storage volumes for storing a back-up copy of said client data files;

a server database for maintaining directory information and reference location information for said copies of said client data files; and a storage manager coupled to said primary storage volumes, said resident copy storage volumes, and said server database, said storage manager storing said primary copy of said client data file received from said client system in said primary storage volume, said storage manager also determining which of said resident copy storage volumes are to be classified as off-site storage volumes and transported to said remote storage site for disaster recovery, said storage manager also reclaiming said off-site storage volumes without mounting said off-site storage volumes at said primary storage site or said remote storage site.

2. The server in claim 1 further comprising:

a first list in said server database identifying a set of eligible off-site storage volumes to be reclaimed, wherein said storage manager queries said directory information and said reference location information in said server database to build said first list.

3. The server in claim 2 further comprising:

a second list in said server database identifying a set of remaining disaster recovery copies stored on said eligible off-site storage volume, said set of remaining disaster recovery copies necessary for disaster recovery, wherein said storage manager queries said directory information and said reference location information in said server database to build said second list.

4. The server in claim 3 wherein said storage manager copies said primary copy corresponding to said remaining back-up copy from said primary storage volume to a recovery resident copy storage volume.

5. The server in claim 4 wherein said storage manager classifies said eligible off-site storage volume as empty when said primary copies corresponding to all of said remaining disaster recovery copies have been copied to said recovery resident copy storage volume.

6. The server in claim 5 wherein said storage manager reuses said eligible off-site storage volume classified as empty once said eligible off-site storage volume is returned to said primary storage site, said eligible off-site storage volume returned only after said recovery resident copy storage volume is transported to said remote site.

7. The server in claim 3 further comprising:

a file space occupied by said set of remaining back-up copies in said eligible off-site storage volume, wherein said storage manager calculates said file space from said reference location information in said server database, said storage manager further comparing said file space to a minimum threshold and determining that said eligible off-site volume can be reclaimed if said file space is less than said minimum threshold.

8. The server in claim 7 wherein said directory information in said server database for each said primary copy and each said back-up copy of said client data file further comprises:

a file name;

a client system identifier;

a file status word;

a time stamp; and a bit-file identifier (bfid).

9. The server in claim 7 wherein said reference location information in said server database for each said primary copy and each said back-up copy of said client data file further comprises:

a storage pool identifier;

a storage volume identifier;

a storage volume offset;

a file size; and a bit-file identifier (bfid).

10. The server in claim 1 wherein said primary storage volumes are direct access storage devices (DASDs).

11. The server in claim 1 wherein said primary storage volumes are magnetic tape cartridges.

12. The server in claim 1 wherein said copy storage volumes are magnetic tape cartridges.

13. In a disaster recovery system having a primary storage site and a remote storage site, said primary storage site having a plurality of client systems generating client data files, a server coupled to said plurality of client systems, said server having a plurality of primary storage volumes for storing a primary copy of said client data files and a plurality of resident copy storage volumes for storing a back-up copy of said client data files, said remote storage site having a plurality of off-site storage volumes for storing said back-up copies needed for disaster recovery, a method in said server for reclaiming said off-site storage volume without mounting said off-site storage volume comprising steps of:

maintaining directory information and reference location information in a server database to link said primary copy and said back-up copy of said client data files;

selecting a set of eligible off-site storage volumes to be reclaimed;

for each said eligible off-site storage volume, identifying a set of remaining back-up copies stored on said off-site storage volume necessary to maintain disaster recovery protection;

for each said remaining back-up copy, copying said primary copy corresponding to said remaining back-up copy from said primary storage volume to a recovery resident copy storage volume; and classifying said recovery resident copy storage volume as a new off-site storage volume and said eligible off-site storage volume as empty.

14. The method of claim 13 further comprising:

reusing said eligible off-site volume as a resident copy storage volume once said eligible off-site volume is returned to said primary storage site, said eligible off-site volume returned to said primary storage site after said recovery resident copy storage volume transported to said remote storage site.

15. The method of claim 13 wherein said selecting step further comprises:

querying said directory information and said reference location information in said server database to identify said off-site storage volumes;

for each said off-site storage volume, calculating a useable space occupied by said remaining back-up copies;

comparing said useable space with a minimum threshold; and categorizing said off-site storage volume as said eligible off-site storage volume if said useable space is less than said minimum threshold.

16. The method of claim 13 wherein said identifying step further comprises:

querying said directory information and said reference location information in said server database to locate said set of remaining back-up copies necessary for disaster recovery.

17. The method of claim 15 wherein said calculating step further comprises:

querying said reference location information in said server database to find a size of each said remaining back-up copy; and adding said size of each said remaining back-up copy stored on said off-site storage volume to determine said useable space.

18. The method of claim 17 wherein said directory information in said server database for each said primary copy and each said back-up copy of said client data file further comprises:

a file name;

a client system identifier;

a file status word;

a time stamp; and a bit-file identifier (bfid).

19. The method of claim 17 wherein said reference location information in said server database for each said primary copy and each said back-up copy of said client data file further comprises:

a storage pool identifier;

a storage volume identifier;

a storage volume offset;

a file size; and a bit-file identifier (bfid).

20. In a disaster recovery system having a primary storage site and a remote storage site, said primary storage site having a plurality of client systems generating client data files, a server coupled to said plurality of client systems, said server having a plurality of primary storage volumes for storing a primary copy of said client data files and a plurality of resident copy storage volumes for storing a back-up copy of said client data files, said remote storage site having a plurality of off-site storage volumes for storing said back-up copies needed for disaster recovery, a program product having executable computer instructions for reclaiming said off-site storage volume without mounting said off-site storage volume comprising:

a computer readable storage medium for storing said executable computer instructions, said executable computer instructions comprising:

maintaining directory information and reference location information in a server database to link said primary copy and said back-up copy of said client data files;

selecting a set of eligible off-site storage volumes to be reclaimed;

for each said eligible off-site storage volume, identifying a set of remaining back-up copies stored on said off-site storage volume necessary to maintain disaster recovery protection;

for each said remaining back-up copy, copying said primary copy corresponding to said remaining back-up copy from said primary storage volume to a recovery resident copy storage volume; and classifying said recovery resident copy storage volume as a new off-site storage volume and said eligible off-site storage volume as empty.

\* \* \* \* \*